Figure 1:
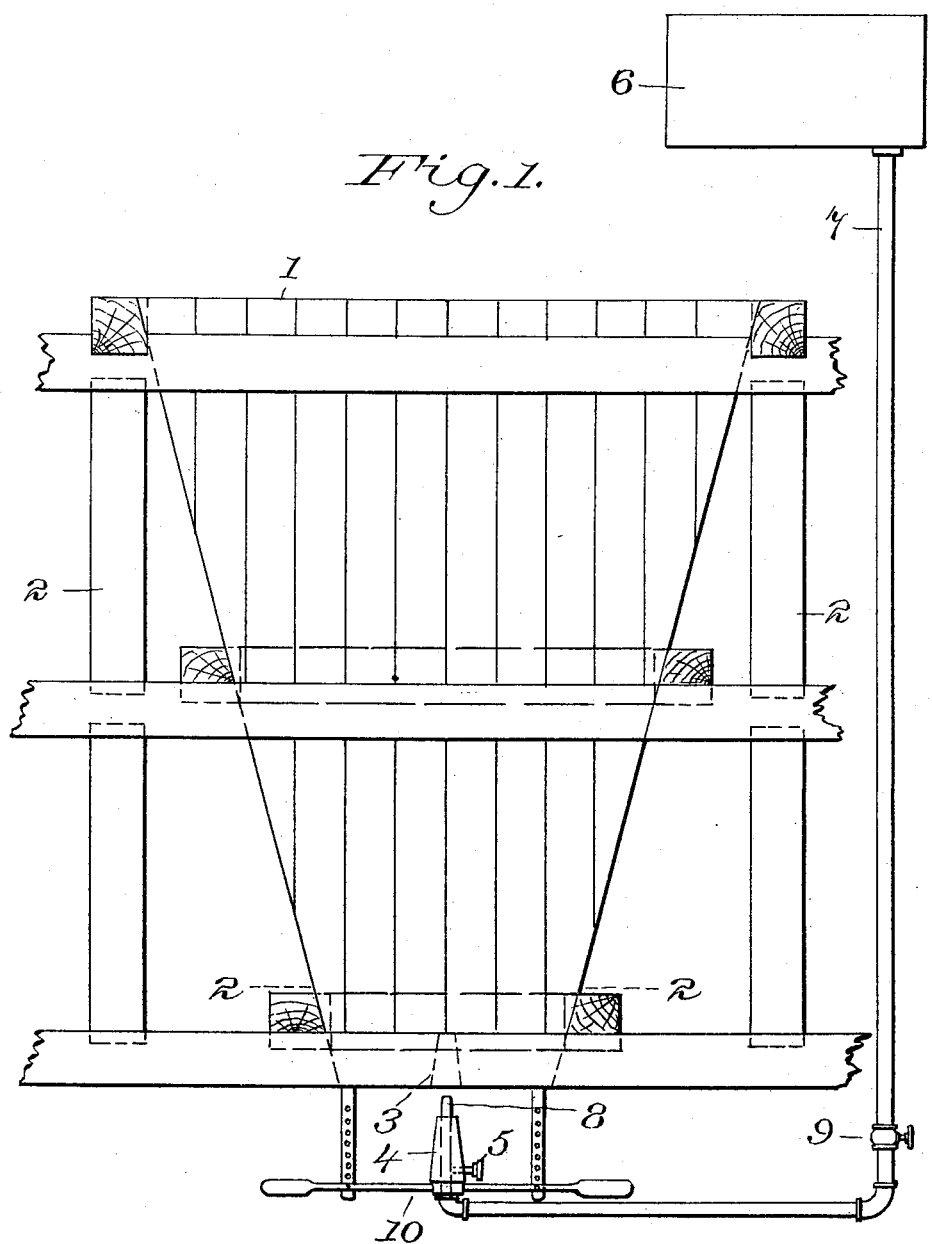

No. 635,781.  
R. H. JEFFREY.  
ORE FEEDER.  
(Application filed Feb. 17, 1899.)  
Patented Oct. 31, 1899.

(No Model.)  
2 Sheets—Sheet 1.

WITNESSES:  
INVENTOR  
Robert Henry Jeffrey  
BY  
ATTORNEYS

No. 635,781.  
R. H. JEFFREY.  
ORE FEEDER.  
(Application filed Feb. 17, 1899.)  
Patented Oct. 31, 1899.

(No Model.)  
2 Sheets—Sheet 2.

WITNESSES:  
INVENTOR  
Robert Henry Jeffrey  
BY  
ATTORNEYS

UNITED STATES PATENT OFFICE.

ROBERT HENRY JEFFREY, OF PINOS ALTOS, MEXICO.

ORE-FEEDER.

SPECIFICATION forming part of Letters Patent No. 635,781, dated October 31, 1899.

Application filed February 17, 1899. Serial No. 705,940. (No model.)

*To all whom it may concern:*

Be it known that I, ROBERT HENRY JEFFREY, residing at Pinos Altos, Mexico, have invented a new and useful Improvement in Ore-Feeders, of which the following is a specification.

My invention relates to a device for automatically feeding ores, tailings, sand, or crushed matter containing ores, &c., to concentrating or other machinery.

The object of the invention is to effect a continuous feed, in regulated quantities, of the material from the settling-tank to concentrating machinery, thereby saving the cost of hand labor and obviating well-known disadvantages incidental to the employment of the same.

The invention is illustrated in the accompanying drawings, wherein like reference characters indicate corresponding parts throughout the several views, in which—

Figure 2:
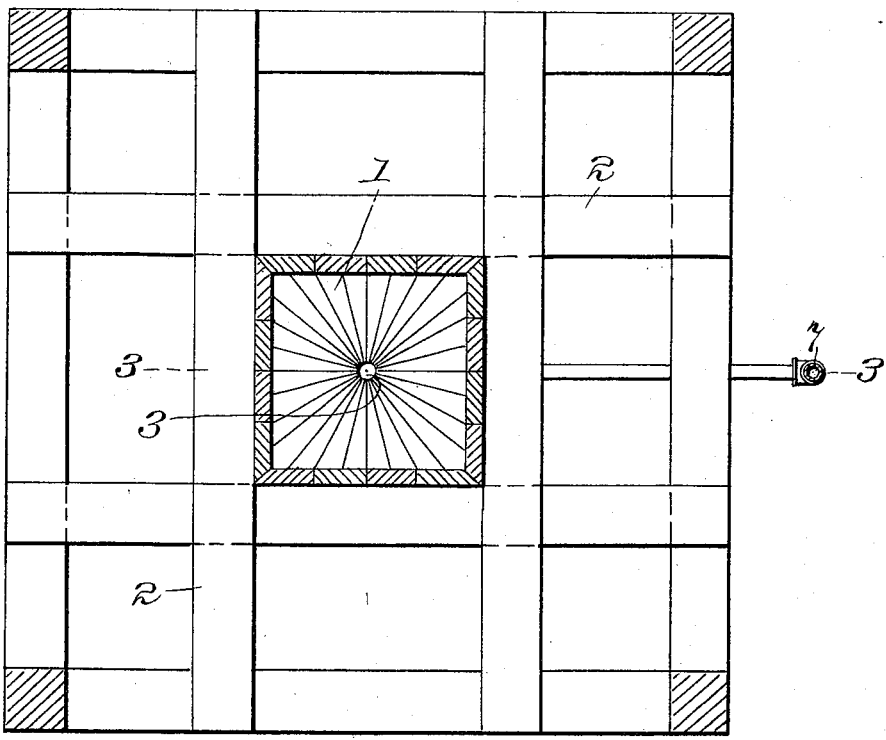
Figure 3:
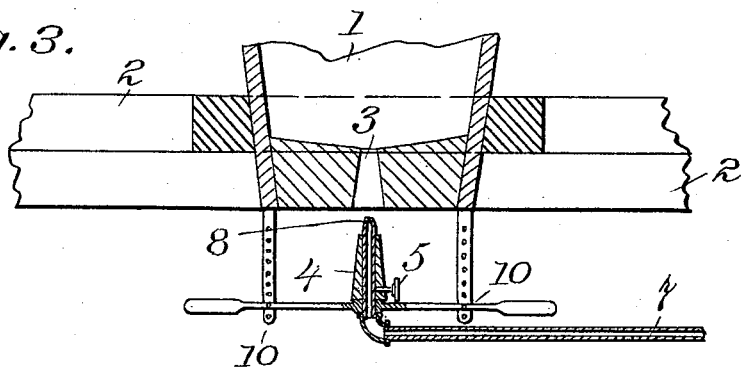

Figure 1 is a view in elevation of one embodiment of the invention applied. Fig. 2 is a horizontal sectional view taken on the line 2 2 of Fig. 1, and Fig. 3 is a vertical sectional view taken on the line 3 3 of Fig. 2.

In the drawings, 1 represents a hopper suitably supported by framing-timbers 2 and designed to serve as a settling-tank for ores or other crushed materials, which are introduced through the upper open end or mouth thereof. The bottom of the tank is closed, except for a central vertically-disposed tapered discharge-opening 3.

4 represents a conical plug relatively arranged to serve as a valve in controlling and regulating the flow of the contained material through the discharge-opening of the tank. This plug is adjustably mounted upon the nozzle of a water-supply pipe and retained in proper position by means of a set-screw or equivalent device 5.

6 represents a source of water-supply or tank, from which a pipe 7 leads downward and terminates in the vertical nozzle 8, above referred to, the flow of water being controlled by a valve 9. By means of a lever or other suitable device 10 the nozzle and plug-valve may be simultaneously adjusted with respect to the discharge-opening to regulate the flow or feed of material from the tank.

In operation the discharge-opening of the hopper is closed by the plug-valve during the time the contained material is settling, and when, therefore, it is desired to run off a portion or start the feed to the concentrating machinery the plug is withdrawn sufficiently to permit the discharge in requisite quantities.

It will be obvious that valves differing in construction may be readily substituted for the form shown to produce substantially the same results, and I therefore do not wish to limit myself to the particular device in detail, as changes may be made without departing from the spirit and scope of my invention.

Having thus fully described my invention, what I claim as new is—

In combination, a hopper provided with a lower tapered discharge-opening, a water-supply pipe terminating in a nozzle, vertically adjustable with respect to said discharge-opening, and a conical plug adjustable upon the nozzle, as specified.

In testimony whereof I affix my signature in the presence of two witnesses.

ROBERT HENRY JEFFREY.

Witnesses:
ENRIQUE SEYFFERT,
ALBERT KRAKAUER.